United States Patent
Mittiga

(10) Patent No.: US 9,995,817 B1
(45) Date of Patent: Jun. 12, 2018

(54) THREE DIMENSIONAL DIRECTION FINDER WITH ONE DIMENSIONAL SENSOR ARRAY

(71) Applicant: Lockheed Martin Corporation, Bethesda, MD (US)

(72) Inventor: David M. Mittiga, Manlius, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 440 days.

(21) Appl. No.: 14/692,192

(22) Filed: Apr. 21, 2015

(51) Int. Cl.
  *G01B 21/22* (2006.01)
  *G01S 5/02* (2010.01)
  *G01S 3/04* (2006.01)

(52) U.S. Cl.
  CPC ............ *G01S 5/0294* (2013.01); *G01B 21/22* (2013.01); *G01S 3/04* (2013.01)

(58) Field of Classification Search
  None
  See application file for complete search history.

(56) References Cited

U.S. PATENT DOCUMENTS

| | | | |
|---|---|---|---|
| 4,891,762 A | 1/1990 | Chotiros | |
| 4,906,940 A | 3/1990 | Greene et al. | |
| 5,182,729 A | 1/1993 | Duren et al. | |
| 5,736,958 A | 4/1998 | Turpin | |
| 5,751,243 A | 5/1998 | Turpin | |
| 8,954,193 B2 | 2/2015 | Sandin et al. | |
| 9,074,892 B2 | 7/2015 | Fink | |
| 2002/0069019 A1 | 6/2002 | Lin | |
| 2003/0036835 A1 | 2/2003 | Breed et al. | |
| 2003/0065262 A1 | 4/2003 | Stergiopoulos et al. | |
| 2003/0210179 A1 | 11/2003 | Dizaji et al. | |
| 2004/0027127 A1 | 2/2004 | Mills | |
| 2004/0090864 A1* | 5/2004 | Larosa | G01S 3/802 367/124 |
| 2004/0129478 A1 | 7/2004 | Breed et al. | |
| 2005/0046584 A1 | 3/2005 | Breed | |
| 2005/0240253 A1 | 10/2005 | Tyler et al. | |
| 2006/0055584 A1 | 3/2006 | Waite et al. | |

(Continued)

OTHER PUBLICATIONS

James Tanner, Circular Motion: Kinematics, Jan. 16, 2003, PHYSNET, 1185-1210.*

(Continued)

*Primary Examiner* — Aditya Bhat
(74) *Attorney, Agent, or Firm* — Howard IP Law Group

(57) ABSTRACT

A tracking computer system may track a target using a single linear array. The system may receive first sensor measurements and one or more additional sensor measurements from the linear array. The system may determine whether a location of the target can be identified based on a cone intersection algorithm. When the target location can be identified based on the cone intersection algorithm, the first and the one or more additional sensor measurements may be applied to the cone intersection algorithm to identify the target location. When target location cannot be identified based on the cone intersection algorithm, the first and the one or more additional sensor measurements may be applied to an angular motion model to determine a best fit arc path corresponding to the target. A true target angle estimate and a target angular velocity may be determined based on the determined best fit arc path.

20 Claims, 9 Drawing Sheets

(56) References Cited

U.S. PATENT DOCUMENTS

| | | | |
|---|---|---|---|
| 2007/0070814 A1 | 3/2007 | Frodyma et al. | |
| 2008/0224929 A1 | 9/2008 | Freed | |
| 2010/0211321 A1 | 8/2010 | Ozdemir et al. | |
| 2011/0164466 A1 | 7/2011 | Hald | |
| 2012/0064916 A1 | 3/2012 | Woodsum | |
| 2012/0104150 A1* | 5/2012 | Elgersma | G01C 21/165 244/3.21 |
| 2014/0236547 A1* | 8/2014 | Itu | G09B 23/28 703/2 |
| 2015/0061927 A1* | 3/2015 | Jin | G01S 13/90 342/25 F |

OTHER PUBLICATIONS

Bao, Chaoying and Bertilone, Derek C. "Frequency-Wavenumber Analysis of Self-Noise in Circular Sonar Arrays", Information, Decision and Control, 2002, Final Program and Abstracts, ISBN 0-7803-7270-0, ID26, pp. 235-240 (6 pgs.), IEEE, 2002.

\* cited by examiner

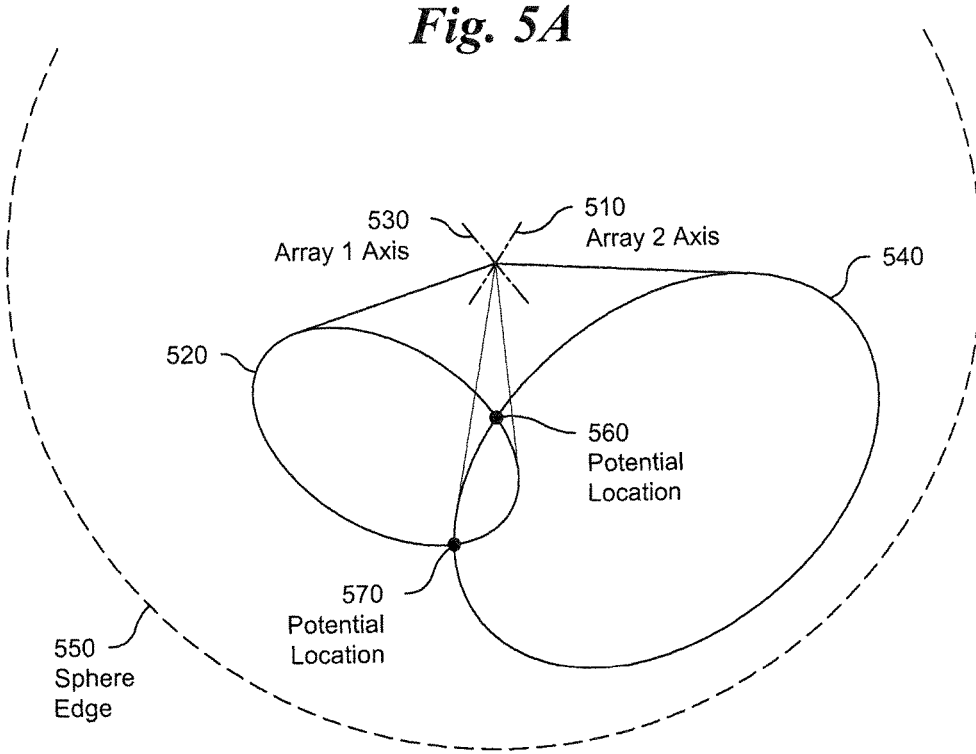
*Fig. 5A*
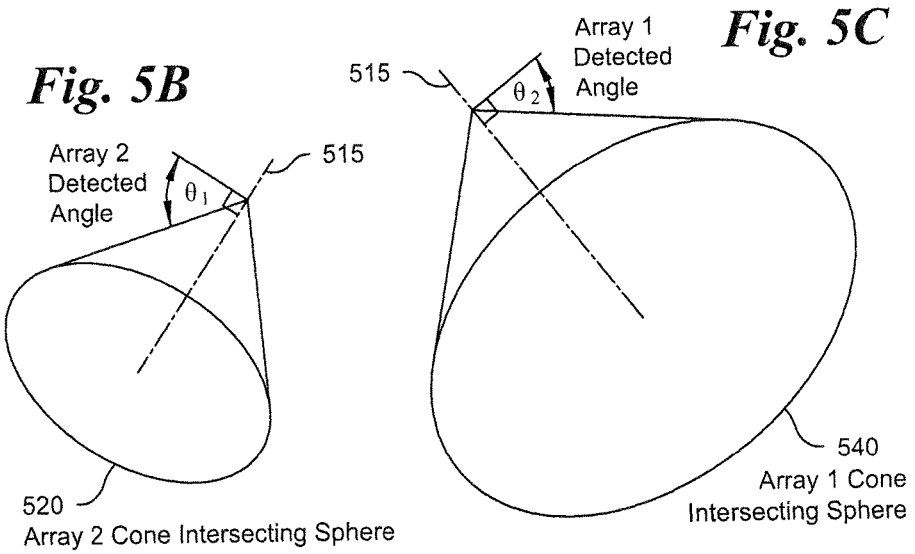
*Fig. 5B*
*Fig. 5C*

THREE DIMENSIONAL DIRECTION FINDER WITH ONE DIMENSIONAL SENSOR ARRAY

FIELD OF THE INVENTION

The present invention relates generally to direction finder systems, and more particularly, to direction finder systems that use a single one dimensional sensor array.

BACKGROUND

One problem associated with tracking objects or airborne targets (e.g., missiles, unmanned aerial vehicles (UAVs), and the like) is finding the direction of arrival (DOA) in 3D space (azimuth and elevation) of a signal using linear arrays of sensors. Since linear arrays are one dimensional, they can only provide "cone angles." The angle calculated is ambiguous about the axis of the array.

This problem may be solved using a second array (typically orthogonal to the first but not necessarily) to resolve angle ambiguities. However, this solution requires additional hardware, typically a second array and associated components, which translates to higher cost and additional space requirements. In space restricted environments such as a ship, the addition of a second array often is not possible.

Alternative systems and methods for direction finding using a single one dimensional sensor array is desired.

SUMMARY

A computer system for tracking a target using a linear array attached to a structure may comprise one or more data storage devices, one or more computer processors in communication with the one or more data storage devices, and a memory storing program instructions which, when executed by the one or more computer processors, cause the one or more computer processors to determine a location of a target with the linear array. The one or more data storage devices may store sensor measurements from the linear array, a cone intersection algorithm, and an angular motion model configured to determine a best fit arc path, a true target angle estimate, and a target angular velocity corresponding to the target. The system may be configured to receive first sensor measurements from the linear array relating to the target including a first time of capture, a first cone angle, and a first linear array axis orientation, and one or more additional sensor measurements from the linear array relating to the target including at least one or more additional times of capture, one or more additional cone angles, and one or more additional linear array axis orientations.

The system may include program instructions which cause the one or more processors to determination whether a location of the target can be identified based on the cone intersection algorithm. Responsive to a determination that the location of the target can be identified based on the cone intersection algorithm, the first sensor measurements, and the one or more additional sensor measurements may be applied to the cone intersection algorithm to identify the location of the target and a true target angle corresponding to the target. Responsive to a determination that the location of the target cannot be identified based on the cone intersection algorithm, the first sensor measurements and the one or more additional sensor measurements may be applied to the angular motion model to determine (1) a best fit arc path corresponding to the target, and (2) a true target angle estimate and a target angular velocity for the target based on the determined best fit arc path. The system may further output one or both of a true target angle estimate and a target angular velocity corresponding to the target.

In an embodiment, the memory storing program instructions to determine whether a location of the target can be identified based on a cone intersection algorithm comprises the memory storing program instructions to determine that a target can be identified based on a cone intersection algorithm when an angle between the first linear array axis orientation and one of the one or more additional linear array axis orientations is greater than a threshold angle. The angular motion model may be configured to determine a best fit arc path based on a determination of a best fit angle based on the first cone angle and the one or more additional cone angles, and the determination of a velocity tangent vector corresponding to the best fit angle. In an embodiment, the angular motion model being configured to determine a best fit arc path comprises the angular motion model being configured to approximate the best fit arc path based on the equations: $p^{(t)}=p_0+vt$, $|p_0|=1$, and $p_0 \cdot v=0$, wherein p is the target location, v is the velocity, and t is the time.

The angular motion model being configured to determine a true target angle estimate and a target angular velocity for the target based on the determined best fit arc path may comprise the angular motion model being configured to (1) generate a system of equations based on the determined best fit arc path and the first sensor measurements and the one or more additional sensor measurements, and (2) determine a solution to the system of equations based on a numerical method. In an embodiment, the numerical method may be a trust-region dogleg algorithm. In another embodiment, the angular motion model being configured to determine a solution to the system of equations based on a numerical method may further comprise the angular motion model being configured to analytically determine a Jacobian of the system of equations. In an embodiment, the memory stores further program instructions which cause the one or more computer processors to transmit, to a tracker computer, the true target angle estimate and the target angular velocity for the target.

A computer-implemented method for tracking a target using a linear array may comprise storing, in a computer memory, a cone intersection algorithm, and an angular motion model configured for determining a best fit arc path, a true target angle estimate, and a target angular velocity corresponding to the target. The method may further include receiving, from a linear array, first sensor measurements corresponding to a target including a first time of capture, a first cone angle, and a first linear array axis orientation, and receiving, from the linear array, one or more additional sensor measurements corresponding to the target including one or more additional times of capture, one or more additional cone angles, and one or more additional linear array axis orientations.

The method may also include determining, by one or more computer processors, whether a location of the target can be identified based on a cone intersection algorithm. In an embodiment, the first sensor measurements and the one or more additional sensor measurements may be applied to the cone intersection algorithm responsive to a determination that the location of the target can be identified based on the cone intersection algorithm. Responsive to a determination that the location of the target cannot be identified based on the cone intersection algorithm, the one or more computer processors may apply the first sensor measurements and the one or more additional sensor measurements to the angular motion model to determine: (1) a best fit arc path corresponding to the target; and (2) a true target angle estimate and a target angular velocity for the target based on the determined best fit arc path. The method may further include outputting, by the one or more computer processors based on application of the first sensor measurements and the one or more additional sensor measurements to the angular motion model, one or both of a true target angle estimate and a target angular velocity corresponding to the target.

A tracking computer system for actively tracking a target using a linear array mounted to a structure may include one or more data storage devices for storing sensor measurements from the linear array, a cone intersection algorithm, and an angular motion model configured to determine a best fit arc path, a true target angle estimate, and a target angular velocity corresponding to the target; one or more tracking computer processors in communication with the one or more data storage devices; and a memory storing program instructions which, when executed by the one or more tracking computer processors, cause the one or more computer processors to determine the location of a target using the linear array measurements. The tracking computer system may be configured to receive first sensor measurements from the linear array relating to the target including a first time of capture, a first cone angle, and a first linear array axis orientation, and receive one or more additional sensor measurements from the linear array relating to the target including one or more additional times of capture, one or more additional cone angles, and one or more additional linear array axis orientations.

The tracking computer system may then determine whether a location of the target can be identified based on the cone intersection algorithm based on whether an angle between the first linear array axis orientation and one of the one or more additional linear array axis orientations is greater than a threshold angle. Responsive to a determination that the location of the target can be identified based on the cone intersection algorithm, the tracking computer system may apply the first sensor measurements and the one or more additional sensor measurements to the cone intersection algorithm to identify the location of the target and a true target angle corresponding to the target. Responsive to a determination that the location of the target cannot be identified based on the cone intersection algorithm, the tracking computer system may apply the first sensor measurements and the one or more additional sensor measurements to an angular motion model to determine a best fit arc path corresponding to the target, and a true target angle estimate and a target angular velocity for the target based on the determined best fit arc path. The tracking computer system may also be configured to output, based on application of the first sensor measurements and the one or more additional sensor measurements to the angular motion model, one or both of a true target angle estimate and a target angular velocity corresponding to the target.

BRIEF DESCRIPTION OF THE DRAWINGS

The details of the invention, both as to its structure and operation, may be obtained by a review of the accompanying drawings, in which like reference numerals refer to like parts, and in which:

FIGS. 5A-5C are perspective views of a unit ball, cones, and cone axes corresponding to sensor measurements;

DETAILED DESCRIPTION

Figure 1:
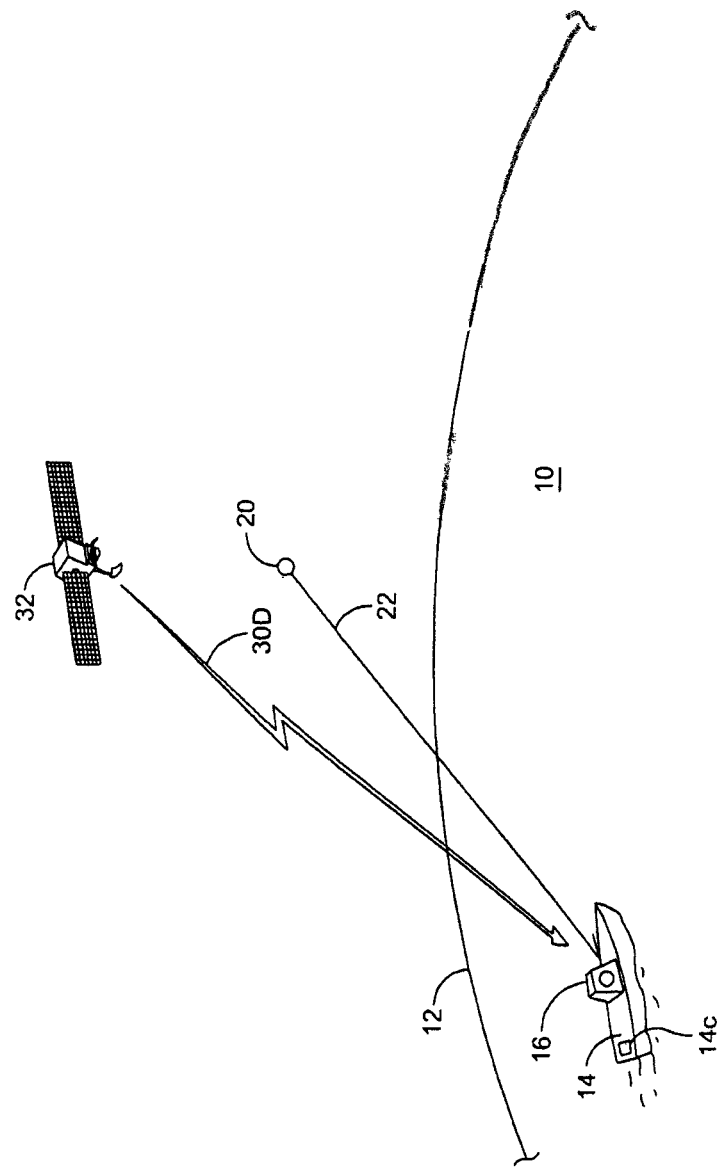
FIG. 1 is a representation of a sensor-equipped ship acquiring images of clusters of objects.

It is to be understood that the figures and descriptions of the present invention have been simplified to illustrate elements that are relevant for a clear understanding of the present invention, while eliminating, for purposes of clarity, many other elements found in sensor-based direction finder systems. However, because such elements are well known in the art, and because they do not facilitate a better understanding of the present disclosure, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

FIG. 1 shows a system 10 which includes a vessel such as a ship 14 carrying a sensor system 16, and a computer processor 14c. As will be understood, sensor system 16 may be a single linear array type sensor. An airborne object 20 over horizon 12 is located by the ship 14 along a line-of-sight 22 by the sensor system, and a sensor image of the object 20 may be recorded into memory (not shown) by computer processor 14c. Ship 14 may include an antenna (not shown) for transmitting target data obtained by the sensor system 16 for the object 20 by path 30D to satellite 32. For example, the target data may be transmitted to satellite 32 so that it may be communicated to other assets within the area.

Figure 2:
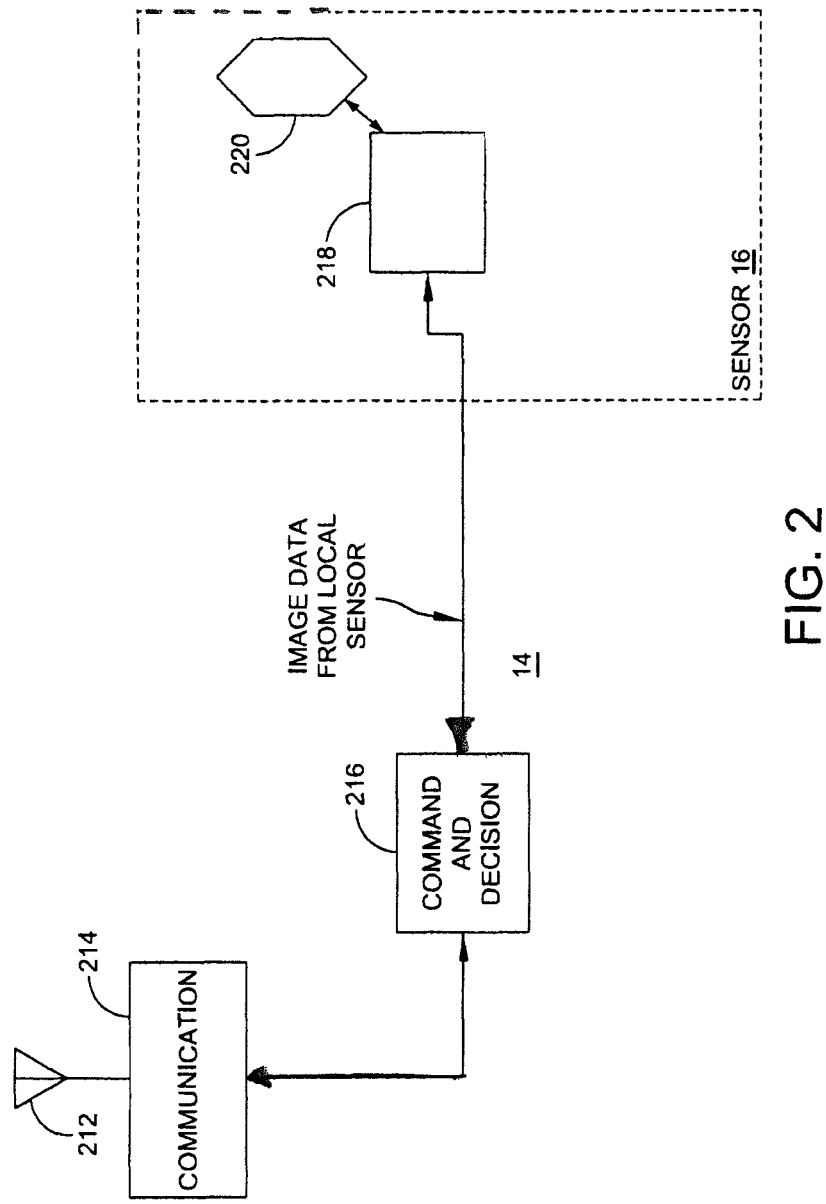
FIG. 2 is a simplified block diagram illustrating various shipboard functions relating to an embodiment including radar acquisition of images.

In FIG. 2, ship 14 includes a communications antenna 212 and communications unit 214 for communicating with other assets, including the communication represented in FIG. 1 by path 30D. As noted, this communication may include target data corresponding to object 20 observed by the linear array of ship 14, so that remote objects are informed of the location of the object 20. The communications unit 214 is coupled to a command and decision (C&D) unit 216. C&D unit 216 of the ship 14 may digitally process the linear array measurements from the ship in processor 14c, and from this processing determine one or more of the target location, a true target angle estimate, and a target angular velocity. The ship 14 of FIG. 2 also includes coupling between the C&D unit 216 and the linear array control unit 218, which may also be part of computer 14c. Linear array control unit 218 may control operation of the linear array 220.

Figure 3:
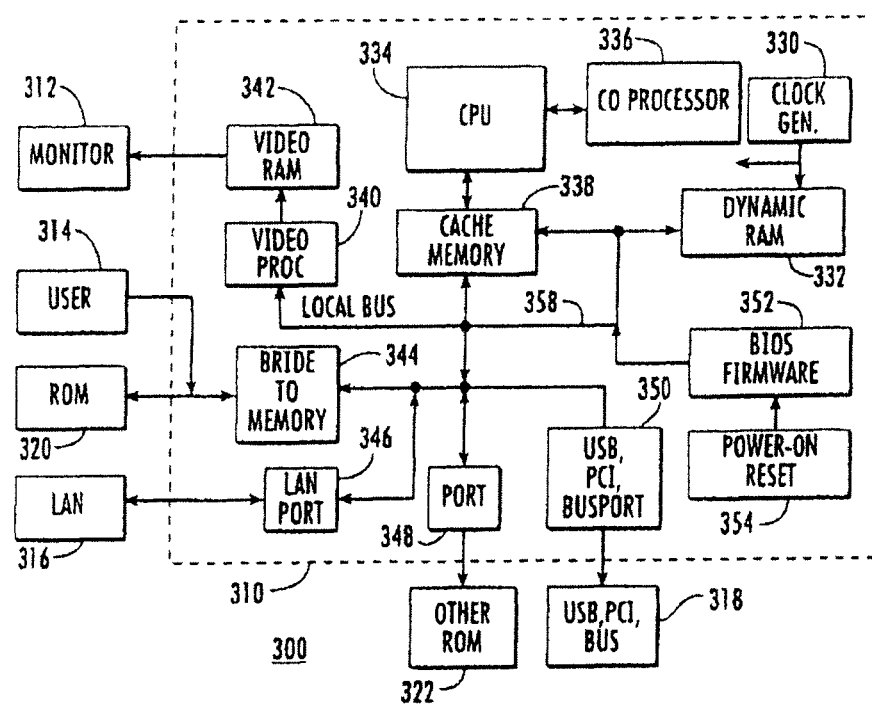
FIG. 3 depicts a representative computer or processor which may perform calculations and processing pursuant to the disclosure.

FIG. 3 is a simplified diagram in block and schematic form illustrating a representative computer which may be used as processor 210 of FIG. 2. In FIG. 3, computer 300 includes a processor or board 310 and outboard elements such as a monitor 312, user controls such as a keyboard and/or mouse, illustrated as a block 314, local area network (LAN) 316, additional buses 318 such as PCI and/or USB, and read-only memory (ROM) 320, which is ordinarily a hard drive, and additional ROM 322, which may be, for example, a flash memory stick or capacitance disk (CD). The main portion of the computer processor or board 310 includes a central processing unit (CPU) 334, which communicates with a cache dynamic memory 338. At initial turn-on of the computer 300, a power-on reset illustrated as a block 354 enables a preloaded basic input/output system (BIOS) flash memory, which loads cache 338 with information that initializes the booting sequence by the CPU. When booted, CPU 334 may communicate with a coprocessor illustrated as 336, and also communicates with main dynamic memory (DRAM) 332 and a local bus 358. Local bus 358 provides communication between the CPU and other elements of the computer, as for example the video processor 340 and video random-access memory 42 for driving a monitor. Local bus 58 also communicates by way of a bridge 344 to external ROM 320 and to user controls 318. Local bus 358 further communicates by way of a port 348 with other ROM 322 if desired, by way of a USB or PCI bridge or port 350 with external buses, and/or by way of a local area network (LAN) port 346 with a LAN 316. Those skilled in the art will understand how to use one or more computers to perform the processing required by elements of the disclosure.

In an embodiment, a one dimensional (1D) linear array on a ship as shown in FIG. 1, or a 1D array on any other type of moving structure, may be used to find a Direction of Arrival in three dimensional space including the azimuth and elevation of an object that is sensed with the array. Because linear arrays are one dimensional, they can only provide "cone angles" with respect to targets, and the angle they calculate is ambiguous about the axis of the array. However, if two or more measurements are made with the linear array, the linear array may effectively act as a separate array at each measurement because the superstructure to which the array is attached will have moved or displaced during the time between the measurements. Thus, rather than using multiple linear arrays with different axes to resolve the cone angle ambiguities, a set of measured cone angles captured by a single array may be collected over a short time duration during which there has been some angular motion of the array axis. With this approach, very little angular motion is needed. This angular motion can be due to multiple factors, but in the context of a ship, it is generally caused by the ship's rolling, pitching, and yawing. The angular motion provides a virtual set of linear arrays. With this understanding, an angular model may be used to resolve the ambiguity and calculate the angle of the target using the two or more measurements.

Figure 4:
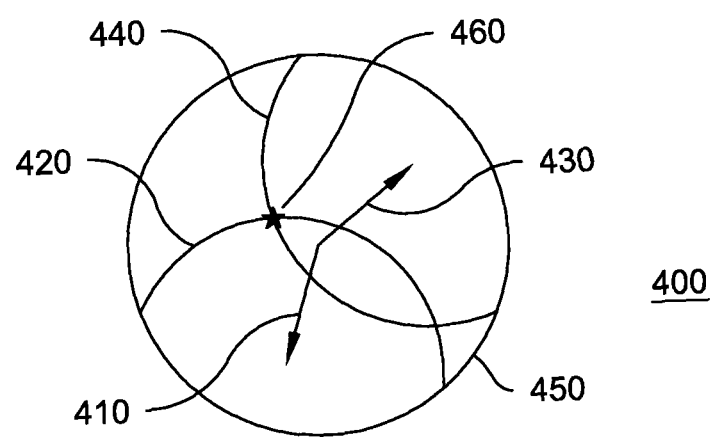
FIG. 4 is a representation of a unit ball, cones, and cone axes corresponding to sensor measurements.

In developing the angular model, it is recognized that in some situations, the movement of the superstructure may be such that two or more cone angle measurements taken in a relatively short period of time have axes that are nearly parallel, while in other situations the movement of the superstructure may be such that the cone angle measurements have greater angular separation. FIG. 4 depicts a two-dimensional representation 400 of a structure in which two measurements by the linear array have a substantial angular separation. Array axis 410 corresponds to cone 420 (partially shown) and array axis 430 corresponds to cone 440 (partially shown). Each cone intersects the unit ball structure 450 to yield a "circle" of ambiguity. However, the circle of ambiguity shown in FIG. 4 is technically a half circle on the unit ball 450 because the line array that made the measurements cannot sense behind itself. Determination of the location of the target comprises determining the intersection points of cones 420 and 440, and determining which is most likely the location of the target. In the example shown in FIG. 4, the location of the target is shown as point 460 on the unit ball 450. While FIG. 4 depicts another intersection point between cones 420 and 440, that intersection is not considered the most likely location of the target because it corresponds to a location that may be below the horizon. It is noted that determination of the location of the target based on cone intersection analysis assumes that the motion of the target and the movement of the array between the two measurements will not contribute significantly to error because the array axes are separated a sufficient distance from one another.

In an embodiment, a determination of whether the location of the target can be identified based on a cone intersection algorithm may be made by an assessment of whether the angle between the first linear array axis orientation, and one of the one or more additional linear array axis orientations, is greater than a threshold angle. When there is sufficient angular separation between the array axes, the location of the target may be determined by the cone intersection algorithm. However, when the angle between the array axes is parallel or nearly parallel in nature, the cone intersection algorithm is not effective, and the location of the target is better determined by an angular model. In an embodiment, a threshold array axes angle (the threshold angle between the array axes of the first and additional measurements by the linear array sensor) may be determined such that, if the angle between the array axes exceeds the threshold array axes angle (or, in other embodiments, is equal to the threshold array axes angle), a determination is made that the location of the target may be determined by the cone intersection algorithm because the angle between measurements is sufficiently large that the cone intersection algorithm will give an accurate result. For example, the threshold angle may be 75 degrees, such that if the angle between the array axes is equal to or exceeds 75 degrees, then a determination is made that the cone intersection algorithm will give an accurate result. The user may select the threshold angle based on experience with the type of linear array being used, the distance from the linear array to the target (is the target close or far), and any other factors that are determined to affect the accuracy of the cone intersection algorithm. When the angle between the array axes is less than the threshold angle (or equal to the angle in embodiments), a determination is made that the location of the target should be determined by an angular motion model because the angle is not sufficiently large for use of the cone intersection algorithm.

FIG. 5A depicts a perspective view of an example in which two cone angle measurements have an angle of separation which permits the determination of a target location based on a cone intersection analysis. Array axis 510 corresponds to cone 520 and array axis 530 corresponds to cone 540. Each cone intersects the unit sphere 550 to give a "circle" of ambiguity. Determination of the location of the target comprises determining the location on the unit sphere 550 that is most likely the location of the target. In the example shown in FIG. 4, the location of the target is one of points 560 and 570, which represent points of intersection between cones 520 and 540. FIG. 5B depicts a more detailed view of cone 520, and further depicts a detected angle corresponding to cone 520, which is the angle between cone 520 and a line normal to the linear array 515. FIG. 5C depicts a more detailed view of cone 540, and further depicts a detected angle corresponding to cone 540, which is the angle between cone 540 and a line normal to the linear array 515. The linear array 515 is the same linear array in both FIGS. 5B and 5C, which has experienced angular motion because of the motion of a superstructure to which the array is attached.

The points of intersection of two cones, such as the two cones depicted in FIGS. 4 and 5A, may be calculated, and then a determination may be made as to which of the intersections represents the location of the target. To find the points of intersection, let $\vec{u}_1$ an $\vec{u}_2$ be the two array axis vectors for the two cones for which intersections are being determined, and let $\sin \theta_1$ and $\sin \theta_2$ be the two measured angles, such as shown in FIGS. 5B and 5C. Based on the foregoing, $\vec{u}_1 \cdot \vec{u}_2 = \cos \phi$ is the angle between the two arrays. The Pythagorean identity $\sin \phi = \sqrt{1 - \cos^2 \phi}$ is also used in the solution.

The two solutions are linear combinations of $\vec{u}_1$, $\vec{u}_2$, and $\vec{u}_1 \times \vec{u}_2$:

$$\vec{s}_1 = A\vec{u}_1 + B\vec{u}_2 + C\vec{u}_1 \times \vec{u}_2 \quad (1)$$

$$\vec{s}_2 = A\vec{u}_1 + B\vec{u}_2 - C\vec{u}_1 \times \vec{u}_2 \quad (2)$$

The scalars for each term (A, B, C) are defined as:

$$A = \frac{\sin\theta_1 - \sin\theta_2 \cos\phi}{\sin^2 \phi} \quad (3)$$

$$B = \frac{\sin\theta_2 - \sin\theta_1 \cos\phi}{\sin^2 \phi} \quad (4)$$

$$C = \begin{cases} \frac{\sqrt{(1-d^2)}}{\sin^2 \phi}, & d^2 \leq 1 \\ \frac{\log(\sqrt{d^2 - 1} + d)}{\sin \phi}, & 1 < d^2 < 1.01 \\ \text{no solution}, & \text{otherwise} \end{cases} \quad (5)$$

Figure 6:
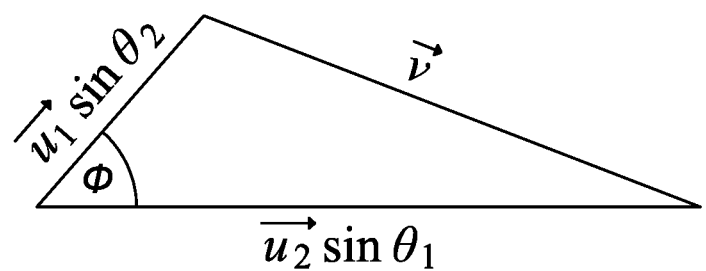
FIG. 6 is a depiction of the relationship between the discriminant and the vector v.

The scalar for term C includes a solution for $1 < d^2 < 1.01$, which provides a solution that is capable of handling slightly noisy measurements, although the solution is not a true solution to the cone intersection. The discriminant $d^2$ is a function of the vector $\vec{v}$, as shown in FIG. 6:

$$d^2 = \frac{|\vec{v}|^2}{\sin^2 \phi} \quad (6)$$

$$\vec{v} = \vec{u}_1 \sin \theta_2 - \vec{u}_2 \sin \theta_1 \quad (7)$$

To choose the best solution from the two solutions of equations (1) and (2), calculations are made to determine which is closer to each array's boresight. To perform the calculation, let $\vec{n}_1$ and $\vec{n}_2$ be the two array normal vectors and compute each dot product:

$$\cos \alpha_{1,1} = \vec{s}_1 \cdot \vec{n}_1 \quad (8)$$

$$\cos \alpha_{1,2} = \vec{s}_1 \cdot \vec{n}_2 \quad (9)$$

$$\cos \alpha_{2,1} = \vec{s}_2 \cdot \vec{n}_1 \quad (10)$$

$$\cos \alpha_{2,2} = \vec{s}_2 \cdot \vec{n}_2 \quad (11)$$

If any of the dot products is negative, it is disregarded since it could not have been detected on both arrays. Otherwise, if all of the dot products are positive, then the chosen dot product, which corresponds to the intersection that corresponds to the target, is the one with a larger product:

$$\vec{s} = \begin{cases} \vec{s}_1, & \cos\alpha_{1,1} \cos\alpha_{1,2} \geq \cos\alpha_{2,1} \cos\alpha_{2,2} \\ \vec{s}_2, & \cos\alpha_{1,1} \cos\alpha_{1,2} < \cos\alpha_{2,1} \cos\alpha_{2,2} \end{cases} \quad (12)$$

Thus, when the array axes of close-in-time measurements have sufficient angular separation, the actual location of the target may be determined by solving for the intersection of the cone angles with the unit ball. The formulas of equations (1)-(12) may be embodied in a cone intersection algorithm which may be stored in the memory of a computer system or tracking system, which may be used to determine the intersection point of cones that have axes that are sufficiently separated. As noted in relation to FIG. 4, the determination of the location of the target based on cone intersection analysis assumes that the motion of the target and the displacement of the array between the two measurements will not contribute much to error because the array axes are sufficiently separated.

Figure 7:
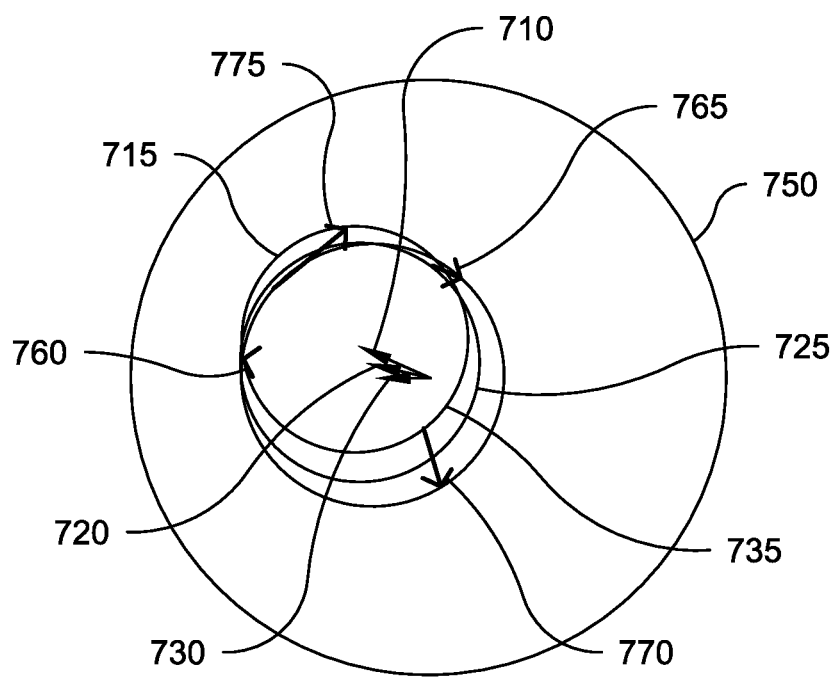
FIG. 7 is a representation of a unit ball, cones, and cone axes corresponding to sensor measurements having substantially parallel cone axes.

FIG. 7 depicts an example 700 in which the axes of the three cone angle measurements by the linear array are nearly parallel. Array axes 710, 720, and 730 correspond to cones 715, 725, and 735 (the cones are partially shown), which are shown with respect to unit ball 750. Arrows 760, 765, 770, and 775 depict cases in which the target has constant angular motion, in which arrow 760 depicts no angular motion, arrow 765 depicts slow angular motion, arrow 770 depicts fast angular motion, and arrow 775 depicts very fast angular motion for one circle to the next.

To find the true target location for cases in which the axes of the cone angle measurements are nearly or substantially parallel, it is difficult to solve for the location based on the intersection of the cones with the unit ball because the error would be too great. Rather, the true target location is determined by using several measurements. In a preferred embodiment a minimum of five measurements would be used in the angular model. Several angular models may apply. The simplest angular model would be just a unit vector, which represents an angle with no motion. Fitting to this model finds the point on the ball which is closest to all cones. While this model is simple, it is not sufficient as target angular motion can easily damage its performance especially when the cone axes are so close together. Another angular model includes adding angular motion to the unit vector model. Despite the simplicity of the idea, adding angular motion (even in a single dimension: a path along an arc) makes the model very complex. A third type of angular model approximates an arc and is advantageous because it is far less complex:

$$p(t)=p_0+vt \quad (13)$$

$$|p_0|=1 \quad (14)$$

$$p_0 \cdot v=0 \quad (15)$$

The above equations model an object moving at constant velocity along a vector tangent to the unit ball. This model is reasonably close to an arc over short periods of time (a few degrees of target motion). Thus, an angular motion model may use equations (13)-(15) to model a best fit arc path in which the target moves along an arc at a constant angular velocity.

Figure 8:
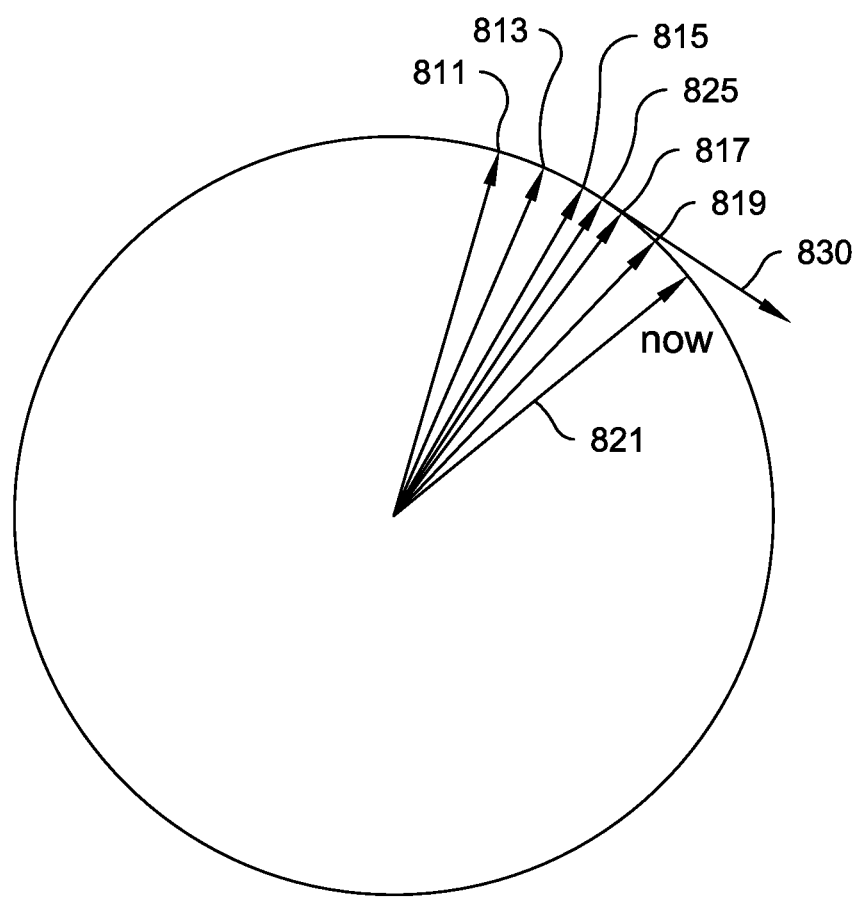
FIG. 8 is a representation of measured angles, a best fit angle, and a velocity vector corresponding to the best fit angle.

FIG. 8 depicts a two dimensional representation 800 of the angular motion model which approximates an arc. Although the model determines the target location in 3D space, visualization of the model in 2D space (which is effectively a cross-section of the 3D space) is instructive. FIG. 8 shows six measured angles represented by arrows 811, 813, 815, 817, 819, and 821, which correspond to angles measured by the linear array, in which each of the arrows represents a cone angle measurement in the 2D cross-section of the 3D space. As will be understood, while this example includes 6 measurements by the linear array, the model may be applied to any example of two or more measurements. In a preferred embodiment, a minimum of five measurements is used in the model. Best fit position based on arrows 811-821 is represented by arrow 825 and a tangent velocity vector corresponding to the best fit arrow is represented by vector 830. In the embodiment, the times were centered on the midpoint of the data (i.e., a midpoint axis) used so that the tangent velocity vector is in the middle of the data rather than the end. Having the tangent velocity vector in the middle of the data may be advantageous because when the tangent vector is near the end of the data, the approximation of using a tangent plane becomes worse. By centering the tangent velocity vector, the model assumptions are best met. However, the final result must be adjusted. Thus, in the embodiment the current target location is not $P_0$ but rather closer to $P_0+Vt_0$. Furthermore, the vector should be unitized.

In an embodiment, the arc approximation may be used to solve for the position of the target. Each cone may be defined by its unit axis vector $x_i$, its angle $\theta_i$, and the time at which the measurement was made $t_i$. A convention may be used in which the cone angle is defined as the angle between the cone and the plane to which the cone axis is normal or orthogonal (rather than the angle between the cone axis and the cone). To simplify the math, a minimization function may be used that works in sine space rather than angle space:

$$\Lambda=\Sigma|x_i^T(p_0+vt_i)-\sin\theta_i|^2+\lambda_1(p_0^Tp_0-1)+\lambda_2(2p_0^Tv) \quad (16)$$

The variables $\lambda_1$ and $\lambda_2$ are Lagrange multipliers used to add the constraints that the position vector has a unit amplitude and the velocity vector is tangent to the unit ball. The 2 in the last element of equation (16) is used to simplify the math, and does not affect the result. Next, the partial derivatives are equated to 0, giving the following system of nonlinear equations:

$$0=Ap_0+Bv-D+\lambda_1p_0+\lambda_2v \quad (17)$$

$$0=Bp_0+Cv-E+\lambda_2p_0 \quad (18)$$

$$0=p_0^Tp_0-1 \quad (19)$$

$$0=p_0^Tv \quad (20)$$

Where:

$$A=\Sigma x_ix_i^T \quad (21)$$

$$B=\Sigma x_ix_i^Tt_i \quad (22)$$

$$C=\Sigma x_ix_i^Tt_i^2 \quad (23)$$

$$D=\Sigma x_i \sin\theta_i \quad (24)$$

$$E=\Sigma x_it_i \sin\theta_i \quad (25)$$

While a closed form solution to this system may be possible, it would be extremely large and complex. In an embodiment, the system of linear equations are instead solved using numerical methods. The M. D. Powell algorithm known as the "trust-region dogleg" algorithm is one numerical method that may be used, and has worked well in modeling and testing. It uses a combination of gradient descent and Newton's method to converge on the solution. The Levenberg-Marquardt algorithm is another numerical method that may be used, however, it did not converge for some tested cases.

When using either the M. D. Powell algorithm or the Levenberg-Marquardt algorithm, a Jacobian of the system of equations may be used. Rather than approximate the Jacobian during the solve, it is easily computed analytically, saving computation time:

$$J = \begin{bmatrix} [A+I\lambda_1] & [B+I\lambda_2] & [p_0] & [v] \\ [B+I\lambda_2] & [C] & [0] & [p_0] \\ [v^T] & [p_0^T] & 0 & 0 \\ [2p_0^T] & [o^T] & 0 & 0 \end{bmatrix} \quad (26)$$

The numerical solvers also operate much faster when supplied with a good initial estimate. For the present model, a good initial estimate for $\lambda_1$ and $\lambda_2$ is 0, which is also a good initial estimate for the velocity vector v. A simple cone intersection calculation, as disclosed earlier, may be used to determine an initial estimate for the position vector, using the two cones with the most axial separation to get the best result.

Finally, a check may be performed to ensure that the cones used have enough separation, indicating that the matrices are not nearly singular. A simple method for this is to compute the standard angle deviation $|\bar{x}|$ and use a threshold such as 1 degree. The derivation follows from:

$$\bar{x} = \frac{1}{n}\sum x_i \quad (27)$$

$$\phi_i = \frac{\bar{x}}{|\bar{x}|} \cdot x_i \quad (28)$$

$$\sigma_\phi = \frac{1}{n|\bar{x}|}\sum \bar{x} \cdot x_i = \frac{n|\bar{x}|^2}{n|\bar{x}|} = |\bar{x}| \quad (29)$$

An angular motion model may use equations (16)-(29) to determine, based on the best fit arc path, the estimated true target angle and the target angular velocity (direction and magnitude).

Figure 9:
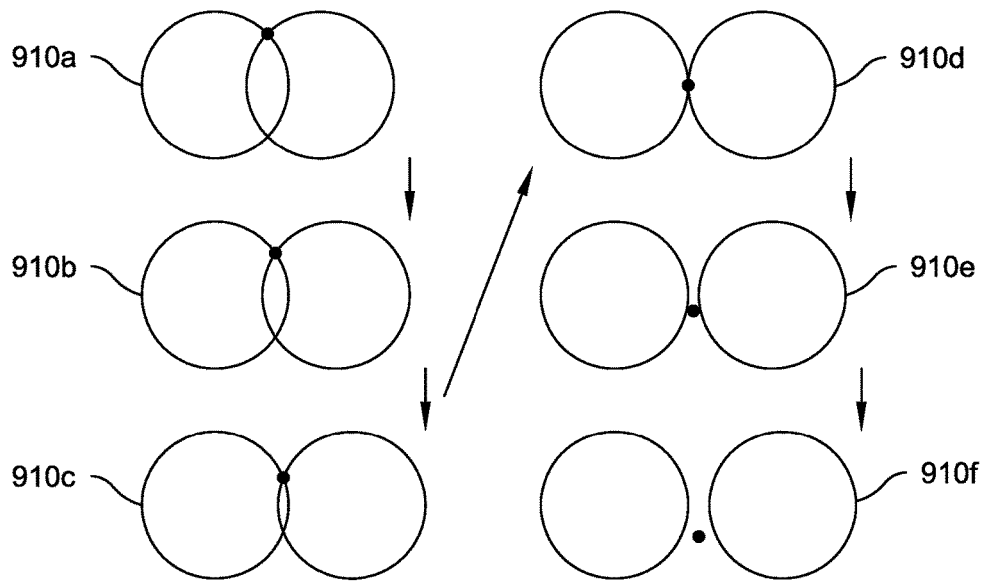
FIG. 9 is a step-by-step representation of intersecting cones that are separating.

FIG. 9 depicts a progression of separating cone pairs 910a-910f, which is useful in considering the derivation for finding the intersection of the cone pairs in relation to the scenario where $1<d^2<1.01$ in equation (5), in which cones may not intersect (e.g. because of old or noisy data) such as shown in cone pairs 910e and 910f on FIG. 9. Finding the intersection of two arbitrary cones when the cones intersect may derived by first defining each cone by its axis unit vector $\vec{a}_1$, $\vec{a}_2$ and the measured cone angle by $\theta_1$, $\theta_2$. First, one may solve for the intersection from the reference frame where $a_1$ lies along the x-axis, and $a_2$ lies along the x-z plane, according to a reference in which x is right, y is into the page, and z is up. Then from this reference frame, we have $$\vec{a}_1 = \begin{bmatrix} 1 \\ 0 \\ 0 \end{bmatrix} \quad (30)$$

$$\vec{a}_2 = \begin{bmatrix} \cos\phi \\ 0 \\ \sin\phi \end{bmatrix} \quad (31)$$

where $$\cos\phi = \vec{a}_1 \cdot \vec{a}_2. \quad (32)$$

Defining the unit vector where the cones intersect as $$\vec{v} = \begin{bmatrix} x \\ y \\ z \end{bmatrix} \quad (33)$$

leads to the following equations:

$$\sin\theta_1 = \vec{a}_1 \cdot \vec{v} = x \quad (34)$$

$$\sin\theta_2 = \vec{a}_2 \cdot \vec{v} = x \cos\phi + z \sin\phi \quad (35)$$

from which formulas for x, y, and z may be derived:

$$x = \sin\theta_1 \quad (36)$$

$$z = \frac{\sin\theta_2 - \sin\theta_1 \cos\phi}{\sin\phi} \quad (37)$$

$$y = \pm\sqrt{1-x^2-z^2} \quad (38)$$

In cases in which $x^2+z^2>1$, then y is complex, which indicates that the cones do not quite intersect, such as shown in 910e and 910f. For example, cones may not intersect when using old or noisy data. In these cases, it is helpful to nevertheless report a valid result. In an embodiment, a point directly in the middle of the two cones may be considered the default result in cases in which the cones do not intersect. However, this embodiment would introduce a bias into the measurement. As shown in FIG. 9 in 910e and 910f, the cone intersection is mimicked on the other side of a point between the two non-intersecting cones. As the cones separate, the correct intersection point moves from one side (upper) to the other (lower). Therefore, when $x^2+z^2>1$, a solution for the imaginary portion is determined:

$$y = \pm \ln(\sqrt{x^2+y^2} + \sqrt{x^2+y^2-1}) \quad (39)$$

Figure 10:
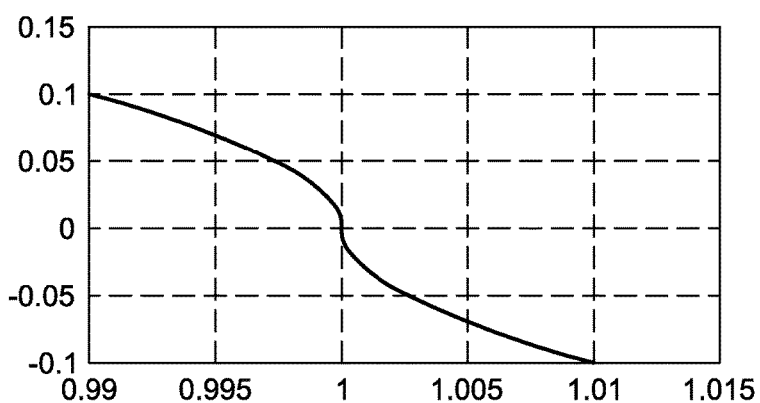
FIG. 10 depicts a plot of a solution for determining the intersection of non-intersecting cones.

FIG. 10 shows a plot 1000 of the solution y in equations (38) and (39).

The final step in the derivation of determining the intersection point of two cones is to transform the solution back to the standard reference frame. To do this, a new basis in the current reference frame is calculated, then inverted, and then multiplied by the v vector. To simplify the calculation, the current basis can be calculated in the new reference frame (the inversion):

$$\vec{X} = \vec{a}_1 \quad (40)$$

$$\vec{Y} = \vec{a}_2 \times \vec{a}_1; \text{ and} \quad (41)$$

$$\vec{Z} = \vec{a}_1 \times (\vec{a}_2 \times \vec{a}_1) \quad (42)$$

Each of the $\vec{X}$, $\vec{Y}$, and $\vec{Z}$ vectors is then converted to unit length:

$$B = \begin{bmatrix} \frac{\vec{X}}{|\vec{X}|} & \frac{\vec{Y}}{|\vec{Y}|} & \frac{\vec{Z}}{|\vec{Z}|} \end{bmatrix} \quad (43)$$

Based on the foregoing, the final solution in the standard reference frame) is:

$$B\vec{v} \quad (44)$$

As shown, the formulas are such that there are always two possible solutions. The correct one may not always comprise the positive selection. In an embodiment, the system and method may include additional logic which can determine which of the two possible solutions provides the correct location of the target. The logic may include rules that determine which of the solutions to select and/or identify as the appropriate or correct solution, such as a rule that selects the solution which is above the horizon. Another rule may be configured to select the solution which is nearest to the last known location of the target. As will be understood, the rules may be configured based on practical experience with the cone intersection algorithm. In embodiments, predictive analysis may be used to select the correct location, using a predictive model which has been trained with data for which the correct location is known.

Figure 11:
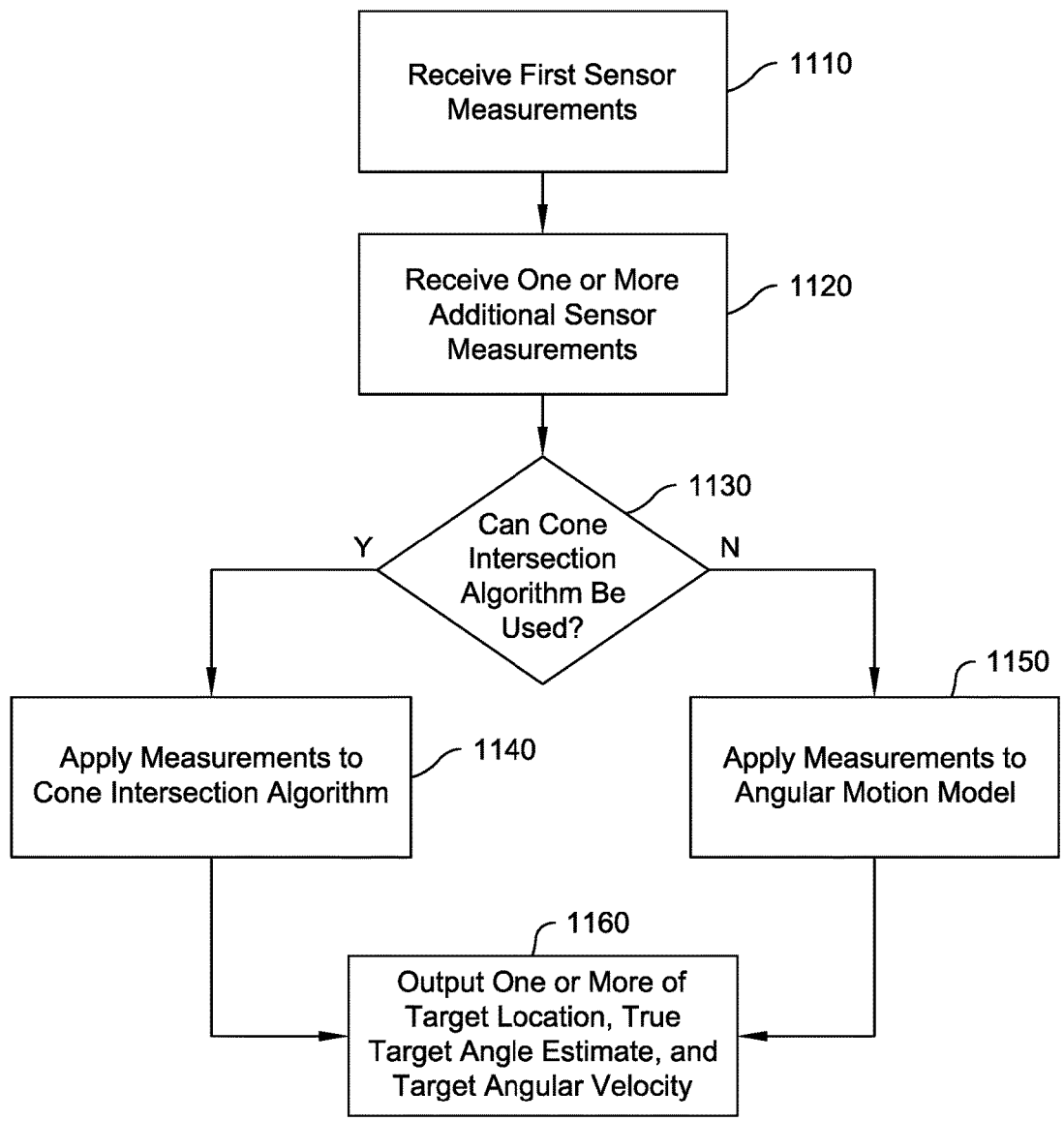
FIG. 11 depicts a process for determining the position of a target using a single linear array.

An embodiment of a process 1100 to determine the position of a target using a single linear array is depicted in FIG. 11. A system performing the process 1100 will include a cone intersection algorithm and an angular motion model to determine a best fit arc path corresponding to a target, stored in computer memory. The computer may be special-hardware for tracking objects such as a tracking computer. At block 1110, first sensor measurements corresponding to a target including a first time of capture, a first cone angle, and a first linear array axis orientation are received from a linear array. The linear array is affixed or attached to a movable structure such as the superstructure of a ship, which permits movement, however small, of the linear array from one measurement to the next because of the movement of the structure. As noted, this movement is used to simulate a virtual array of linear arrays. At block 1120, one or more additional sensor measurements corresponding to the target including at least one or more additional times of capture, one or more additional cone angles, and one or more additional linear array axis orientations are received from the linear array. As noted herein, while the system and method may operate with as few as two measurements, more than two measurements may increase the accuracy of target location determinations, particularly when subsequent measurements are taken with the array axis at diverse positions such as when the array axis for one measurement is less parallel to another the array axis when another measurement is made.

After measurements are received from the linear array, at block 1130 they may be assessed to determine whether the target location can be determined by an intersection calculation algorithm, or whether an angular motion model is need to determine the target location. As noted, a determination whether the location of the target can be identified based on a cone intersection algorithm may be made by an assessment of the angle between the first linear array axis orientation and one of the one or more additional linear array axis orientations is greater than a threshold angle. As noted, when the angle between the array axes is sufficiently large, the location of the target may be determined by the cone intersection algorithm. However, when the angle between the array axes is parallel or nearly parallel in nature, the cone intersection algorithm is not effective, and the location of the target is better determined by an angular model. In an embodiment, a threshold array axes angle (threshold angle between the array axes of the first and additional measurements by the linear array sensor) may be determined such that, if the angle between the array axes exceeds the angle (or equal the angle in embodiments), a determination is made that the location of the target may be determined by the cone intersection algorithm because the angle between measurements is sufficiently large that the cone intersection algorithm will give an accurate result. For example, the threshold angle may be 75 degrees, such that if the angle between the array axes is equal to or exceeds 75 degrees, then a determination is made that the cone intersection algorithm will give an accurate result. The user may select the threshold angle based on experience with the type of linear array being used, the distance from the linear array to the target (is the target close or far), and any other factors that are determined to affect the accuracy of the cone intersection algorithm. When the angle between the array axes is less than the threshold angle (or equal to the angle in embodiments), a determination is made that the location of the target should be determined by an angular motion model because the angle is not sufficiently large for use of the cone intersection algorithm.

If a determination is made at block 1130 that the location of the target can be identified based on the cone intersection algorithm, the process continues to block 1140 and the first sensor measurements and the one or more additional sensor measurements are applied to the cone intersection algorithm. As noted, the cone intersection algorithm may be stored in the system memory and may implement the formulas of equations (1)-(12) to determine the intersection point of cones having axes that are sufficiently separated.

If a determination is made at block 1130 that the location of the target can be identified based on the cone intersection algorithm, the process continues to block 1150 and the first sensor measurements and the one or more additional sensor measurements are applied to the angular motion model. The angular motion model which was stored at block 1110 is used for the processing. At block 1150, the measurements from the linear array, including the first measurement, and the one or more additional measurements, may be applied by a computer processor to the angular motion model to determine a best fit arc path corresponding to the target, as described in relation to equations (13)-(15). Then as shown in equations (16)-(29), the best fit arc path and the linear array measurements are used to derive a system of non-linear equations that may be solved using numerical methods, and from which the true angle estimate and the angular velocity of the target may be determined. The process depicted in FIG. 11 ends at block 1160, in which the computer processor outputs one or more of the target location, the true angle estimate of the target, and the target angular velocity, based on application of the first sensor measurements and the one or more additional sensor measurements to the angular motion model.

As will be understood, the output of the true angle estimate and the angular velocity may be transmitted to other systems that have use of such data. In an embodiment, the true angle estimate and the angular velocity may be output and/or transmitted to a weapons system for targeting purposes. In another embodiment, the true angle estimate and the angular velocity may be output or transmitted to a display (such as the display of an operator) that includes a depiction of the target being tracked. In an embodiment, the measurements and associated true angle estimate and angular velocity may be stored in a data warehouse or other memory.

Though the invention is described in the context of being mounted an a ship, it can apply elsewhere. Rather than using multiple arrays with different axes to resolve the cone angle ambiguities, a set of measured cone angles can be collected and captured by a single array over a short time duration during which there has been some angular motion of the array axis (very little motion is needed}. This angular motion can be due to anything, but in the context of a ship, it is generally caused by the ship's rolling, pitching, and yawing. The angular motion gives us a virtual set of arrays. If the assumption can be made that the array translational motion is much smaller than the target translational motion during the period of time during which the set of cones were captured (such as the case with a ship and a plane), then we can solve for the target angle in 3 U space (resolve the cone angle ambiguities). This is done by finding the best fit model to the set of cones as described herein.

In other embodiments, the linear array may be mounted to a movable platform that supplies the movement needed to replicate a virtual array of linear arrays, rather than (or in addition to) using the movement of a superstructure such as a ship to provide the movement needed by the angular model. In embodiments, the movable platform may rotate; in others it may move linearly. For example, in an embodiment, the linear array may be mounted to a rotating disc on a stationary or moving superstructure. In embodiments, the disc may be a low friction structure that rotates freely and which exaggerates the movement applied to the disc such as by the movement of a ship, thereby providing a greater range of movement between measurements than would be expected by the ship movement alone. In another embodiment, the linear array may be a towed sonar array, which may experience movement due to movement of a ship towing the array and/or movement of the linear array due to wave activity. Other implementations, such as land based implementations, which include a linear array and which include movement of the linear array, even small, during the taking of measurements, may implement embodiments of the disclosure to effect a virtual array and determine a true angle estimate and angular velocity of an object sensed by the linear array.

In an embodiment, the process of FIG. 11 may be performed by a system such as depicted in FIGS. 1-3. In an embodiment, the system may comprise a linear array for obtaining sensor measurements relating to an object being tracked, one or more data storage devices for storing the sensor measurements, one or more computer processors in communication with the one or more data storage devices, and a memory for storing program instructions which are configured to cause the one or more computer processors to effect the angular model in accordance with the process of FIG. 11.

The Processing system 210 (FIG. 1) is described and illustrated herein only as exemplary systems for performing the described angular model to determine the true angle estimate and angular velocity of an object sensed by a linear array, and other embodiments may be contemplated by one of skill in the pertinent art without departing from the intended scope of this disclosure. More generally, the process or processes explained herein may be computer-implemented methods performed by one or more processors, which processors access a memory device, the memory device containing instructions, which instructions, when executed by the processors, cause the steps of a method for receiving linear array measurements and determining the position of a target using an angular model performed by the processors. It is understood that the processes may also be performed by special-purpose hardware, such as, but not limited to special purpose tracking/tracker computers with special purpose tracking/tracker computer processors and related hardware. Thus, the entire process, or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A direction finding system for tracking a target comprising:
   a linear sensor array configured to be attached to a structure;
   one or more data storage devices for storing sensor measurements from the linear sensor array, a cone intersection algorithm, and an angular motion model configured to determine a best fit arc path, a true target angle estimate, and a target angular velocity corresponding to the target;
   a command and decision unit including one or more computer processors in communication with the one or more data storage devices; and
   a memory storing program instructions which, when executed by the one or more computer processors, cause the one or more computer processors to:
     receive first sensor measurements from the linear sensor array relating to the target including a first time of capture, a first cone angle, and a first linear sensor array axis orientation;
     receive one or more additional sensor measurements from the linear sensor array relating to the target including at least one or more additional times of capture, one or more additional cone angles, and one or more additional linear sensor array axis orientations;
     determine whether a location of the target can be identified based on the cone intersection algorithm;
     responsive to a determination that the location of the target can be identified based on the cone intersection algorithm, apply the first sensor measurements and the one or more additional sensor measurements to the cone intersection algorithm to identify the location of the target and the true target angle corresponding to the target, wherein the location of the target corresponds to an intersection between the first cone angle and the one or more additional cone angles determined by the cone intersection algorithm;
     responsive to a determination that the location of the target cannot be identified based on the cone intersection algorithm, apply the first sensor measurements and the one or more additional sensor measurements to the angular motion model to determine:
       the best fit arc path corresponding to the target; and
       the true target angle estimate and the target angular velocity for the target based on the determined best fit arc path; and
     output one or both of the true target angle estimate and the target angular velocity corresponding to the target for determining target location.

2. The direction finding system of claim 1, wherein the memory storing program instructions to determine whether the location of the target can be identified based on the cone intersection algorithm comprises the memory storing program instructions to determine that a target can be identified based on a cone intersection algorithm when an angle between the first linear sensor array axis orientation and one of the one or more additional linear sensor array axis orientations is greater than a threshold angle.

3. The direction finding system computer of claim 1, wherein the angular motion model being configured to determine a best fit arc path comprises the angular motion model being configured to:
  determine a best fit angle based on the first cone angle and the one or more additional cone angles; and
  determine a tangent velocity vector corresponding to the best fit angle.

4. The direction finding system of claim 1, wherein the angular motion model being configured to determine a best fit arc path comprises the angular motion model being configured to approximate the best fit arc path based on equations:

$$p(t)=p_0+vt$$

$$|p_0|=1$$

$$p_0 \cdot v=0$$

wherein p is target location, v is velocity, and t is time.

5. The direction finding system of claim 1, wherein the angular motion model being configured to determine the true target angle estimate and the target angular velocity for the target based on the determined best fit arc path comprises the angular motion model being configured to:
  generate a system of equations based on the determined best fit arc path and the first sensor measurements and the one or more additional sensor measurements; and
  determine a solution to the system of equations based on a numerical method.

6. The direction finding system of claim 5, wherein the numerical method comprises a trust-region dogleg algorithm.

7. The direction finding system of claim 5, wherein the angular motion model being configured to determine the solution to the system of equations based on the numerical method further comprises the angular motion model being configured to analytically determine a Jacobian of the system of equations.

8. The direction finding system of claim 1, wherein the memory stores further program instructions which cause the one or more computer processors to transmit, to a tracker computer, the true target angle estimate and the target angular velocity for the target.

9. A method for tracking a target using a linear sensor array of a direction finding system comprising:
  storing, in a computer memory, a cone intersection algorithm, and an angular motion model configured for determining a best fit arc path, a true target angle estimate, and a target angular velocity corresponding to the target;
  receiving with a command and decision unit, first sensor measurements from a linear sensor array of the direction finding system corresponding to a target including a first time of capture, a first cone angle, and a first linear sensor array axis orientation;
  receiving with the command and decision unit, one or more additional sensor measurements from the linear sensor array corresponding to the target including one or more additional times of capture, one or more additional cone angles, and one or more additional linear sensor array axis orientations;
  determining, by one or more computer processors of the command and decision unit, whether a location of the target can be identified based on the cone intersection algorithm;
  responsive to a determination that the location of the target can be identified based on the cone intersection algorithm, applying, by the one or more computer processors of the command and decision unit, the first sensor measurements and the one or more additional sensor measurements to the cone intersection algorithm to identify the location of the target and a true target angle corresponding to the target, wherein the location of the target corresponds to an intersection between the first cone angle and the one or more additional cone angles determined by the cone intersection algorithm;
  responsive to a determination that the location of the target cannot be identified based on the cone intersection algorithm, applying, by the one or more computer processors of the command and decision unit, the first sensor measurements and the one or more additional sensor measurements to the angular motion model to determine:
    the best fit arc path corresponding to the target; and
    the true target angle estimate and a target angular velocity for the target based on the determined best fit arc path; and
  outputting, by the one or more computer processors of the command and decision unit based on application of the first sensor measurements and the one or more additional sensor measurements to the angular motion model, one or both of the true target angle estimate and the target angular velocity corresponding to the target for determining target location.

10. The method of claim 9, wherein determining whether the location of the target can be identified based on the cone intersection algorithm comprises determining that a target can be identified based on the cone intersection algorithm when an angle between the first linear sensor array axis orientation and one of the one or more additional linear sensor array axis orientations is greater than a threshold angle.

11. The method of claim 9, wherein the angular motion model being configured for determining a best fit arc path comprises the angular motion model being configured for:
  determining a best fit angle based on the first cone angle and the one or more additional cone angles; and
  determining a tangent velocity vector corresponding to the best fit angle.

12. The method of claim 11, wherein determining the best fit angle based on the first cone angle and the one or more additional cone angles and determining the tangent velocity vector corresponding to the best fit angle comprises:
  determining a midpoint axis to the first sensor array axis orientation and the one or more additional sensor array axis orientations; and
  determining, based on the midpoint axis, the tangent velocity vector to the midpoint axis.

13. The method of claim 9, wherein the angular motion model being configured for determining a best fit arc path comprises the angular motion model being configured for approximating the best fit arc path based on equations:

$$p(t)=p_0+vt$$

$$|p_0|=1$$

$$p_0 \cdot v=0$$

wherein p is target location, v is velocity, and t is time.

14. The method of claim 9, wherein the angular motion model being configured for determining the true target angle estimate and the target angular velocity for the target based on the determined best fit arc path comprises the angular motion model being configured for:
  generating a system of equations based on the determined best fit arc path and the first sensor measurements and the one or more additional sensor measurements; and
  determining a solution to the system of equations based on a numerical method.

15. The method of claim 14, wherein the numerical method comprises a trust-region dogleg algorithm.

16. A tracking computer system for actively tracking a target using a linear sensor array mounted to a structure:
  one or more data storage devices for storing sensor measurements from the linear sensor array, a cone intersection algorithm, and an angular motion model configured to determine a best fit arc path, a true target angle estimate, and a target angular velocity corresponding to the target;
  one or more tracking computer processors in communication with the one or more data storage devices;
  a memory storing program instructions which, when executed by the one or more tracking computer processors, cause the one or more computer processors to:
    receive first sensor measurements from the linear sensor array relating to the target including a first time of capture, a first cone angle, and a first linear sensor array axis orientation;
    receive one or more additional sensor measurements from the linear sensor array relating to the target including one or more additional times of capture, one or more additional cone angles, and one or more additional linear sensor array axis orientations;
    determine whether a location of the target can be identified based on the cone intersection algorithm based on whether an angle between the first linear sensor array axis orientation and one of the one or more additional linear sensor array axis orientations is greater than a threshold angle;
    responsive to a determination that the location of the target can be identified based on the cone intersection algorithm, apply the first sensor measurements and the one or more additional sensor measurements to the cone intersection algorithm to identify the location of the target and a true target angle corresponding to the target, wherein the location of the target corresponds to an intersection between the first cone angle and the one or more additional cone angles determined by the cone intersection algorithm;
    responsive to a determination that the location of the target cannot be identified based on the cone intersection algorithm, apply the first sensor measurements and the one or more additional sensor measurements to the angular motion model to determine:
      the best fit arc path corresponding to the target; and
      the true target angle estimate and the target angular velocity for the target based on the determined best fit arc path; and
    output, based on application of the first sensor measurements and the one or more additional sensor measurements to the angular motion model, one or both of the true target angle estimate and the target angular velocity corresponding to the target for determining target location.

17. The tracking system of claim 16, wherein the angular motion model being configured to determine a best fit arc path comprises the angular motion model being configured to:
  determine a best fit angle based on the first cone angle and the one or more additional cone angles; and
  determine a tangent velocity vector corresponding to the best fit angle.

18. The tracking system of claim 16, wherein the angular motion model being configured to determine a best fit arc path comprises the angular motion model being configured to approximate the best fit arc path based on equations:

$$p(t) = p_0 + vt$$

$$|p_0| = 1$$

$$p_0 \cdot v = 0$$

wherein p is target location, v is velocity, and t is time.

19. The tracking system of claim 16, wherein the angular motion model being configured to determine the true target angle estimate and the target angular velocity for the target based on the determined best fit arc path comprises the angular motion model being configured to:
  generate a system of equations based on the determined best fit arc path and the first sensor measurements and the one or more additional sensor measurements; and
  determine a solution to the system of equations based on a numerical method.

20. The tracking system of claim 19, wherein the numerical method comprises a trust-region dogleg algorithm.

* * * * *

UNITED STATES PATENT AND TRADEMARK OFFICE
CERTIFICATE OF CORRECTION

PATENT NO. : 9,995,817 B1
APPLICATION NO. : 14/692192
DATED : June 12, 2018
INVENTOR(S) : David M. Mittiga Page 1 of 1

It is certified that error appears in the above-identified patent and that said Letters Patent is hereby corrected as shown below:

In the Claims

Claim 16, Column 19, Line 14, the term "computer" should be removed.

Signed and Sealed this
Twenty-first Day of August, 2018

Andrei Iancu
*Director of the United States Patent and Trademark Office*